United States Patent
Rabbitt et al.

(10) Patent No.: US 11,445,712 B2
(45) Date of Patent: Sep. 20, 2022

(54) CAM REEL ATTACHMENT

(71) Applicant: Pure Fishing, Inc., Columbia, SC (US)

(72) Inventors: William Rabbitt, Chesterland, OH (US); Lindsey Tufts, Jr., Kent, OH (US); Robert Soreo, Cleveland Heights, OH (US)

(73) Assignee: Pure Fishing, Inc., Columbia, SC (US)

( * ) Notice: Subject to any disclaimer, the term of this patent is extended or adjusted under 35 U.S.C. 154(b) by 84 days.

(21) Appl. No.: 16/887,155

(22) Filed: May 29, 2020

(65) Prior Publication Data
US 2021/0259226 A1   Aug. 26, 2021

Related U.S. Application Data

(60) Provisional application No. 62/981,623, filed on Feb. 26, 2020.

(51) Int. Cl.
*A01K 87/06* (2006.01)
*A01K 87/08* (2006.01)

(52) U.S. Cl.
CPC .............. *A01K 87/06* (2013.01); *A01K 87/08* (2013.01)

(58) Field of Classification Search
CPC ......... A01K 87/06; A01K 87/08; A01K 87/00
See application file for complete search history.

(56) References Cited

U.S. PATENT DOCUMENTS

| | | | |
|---|---|---|---|
| 2,777,240 A * | 6/1954 | Hutchison | ............ A01K 87/06 |
| 3,461,594 A | 8/1969 | Ohmura | |
| 4,237,640 A | 12/1980 | Sato | |
| 4,554,755 A | 11/1985 | Hsu | |
| 4,648,195 A | 3/1987 | Kim | |
| 4,726,139 A * | 2/1988 | Tokuda | ............ A01K 87/06 43/22 |
| 9,807,988 B2 | 11/2017 | Westerfield | |
| 10,111,414 B2 | 10/2018 | Omura | |
| 10,321,669 B2 | 6/2019 | Akiba et al. | |
| 2015/0007482 A1 | 1/2015 | Westerfield | |
| 2015/0181851 A1 | 7/2015 | Akiba et al. | |

FOREIGN PATENT DOCUMENTS

| | | | |
|---|---|---|---|
| EP | 0007797 | 2/1980 | |
| FR | 2605845 | 1/1989 | |
| GB | 2250168 | 8/1994 | |
| KR | 19980063812 U * | 11/1998 | ............ A01K 87/06 |
| KR | 200149677 | 6/1999 | |

OTHER PUBLICATIONS

International Search Report filed in PCT/US2021/017364 dated Jul. 22, 2021.

* cited by examiner

*Primary Examiner* — Joshua J Michener
*Assistant Examiner* — Henry Hooper Mudd
(74) *Attorney, Agent, or Firm* — Husch Blackwell LLP

(57) ABSTRACT

A grip assembly configured for fixing a reel to a fishing rod includes a front seat grip non-movably fixable to a fishing rod, a gear rack on the front seat grip, a sliding grip movably fixable to the fishing rod and configured to slide in an axial direction of the fishing rod so as to selectively engage the front seat grip, a lever pivotally connected to the sliding grip, and at least one tooth provided on the lever. When the lever is actuated from an open position to a locked position, the at least one tooth engages the gear rack and the lever pulls the sliding grip toward the front seat grip on the fishing rod.

12 Claims, 10 Drawing Sheets

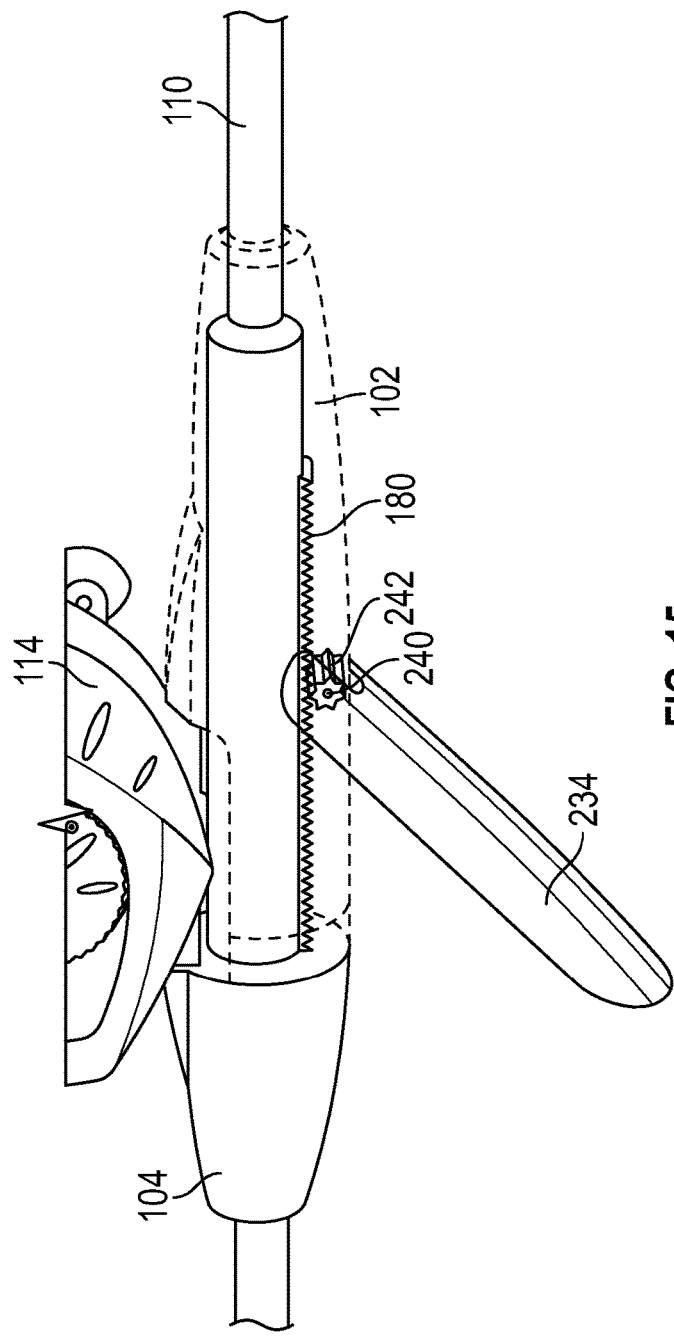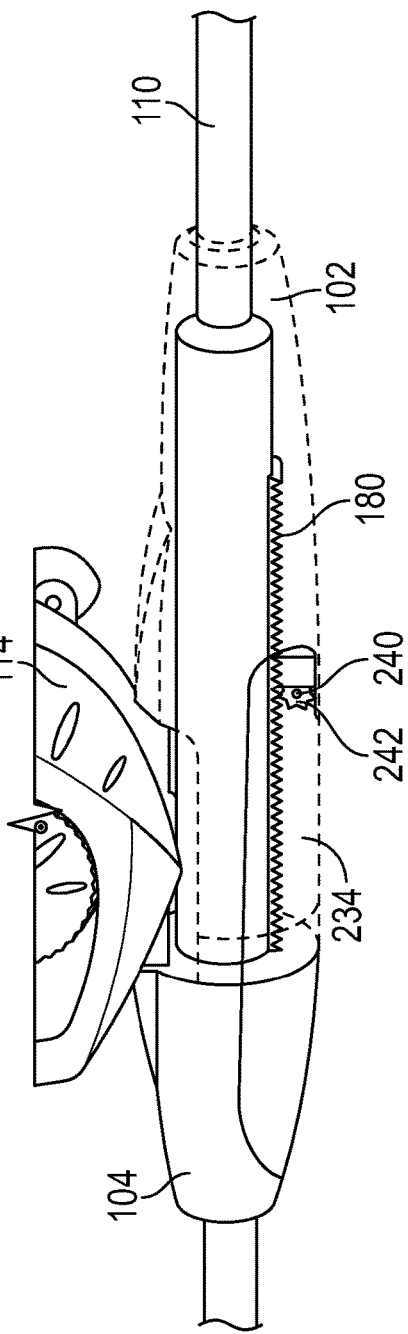

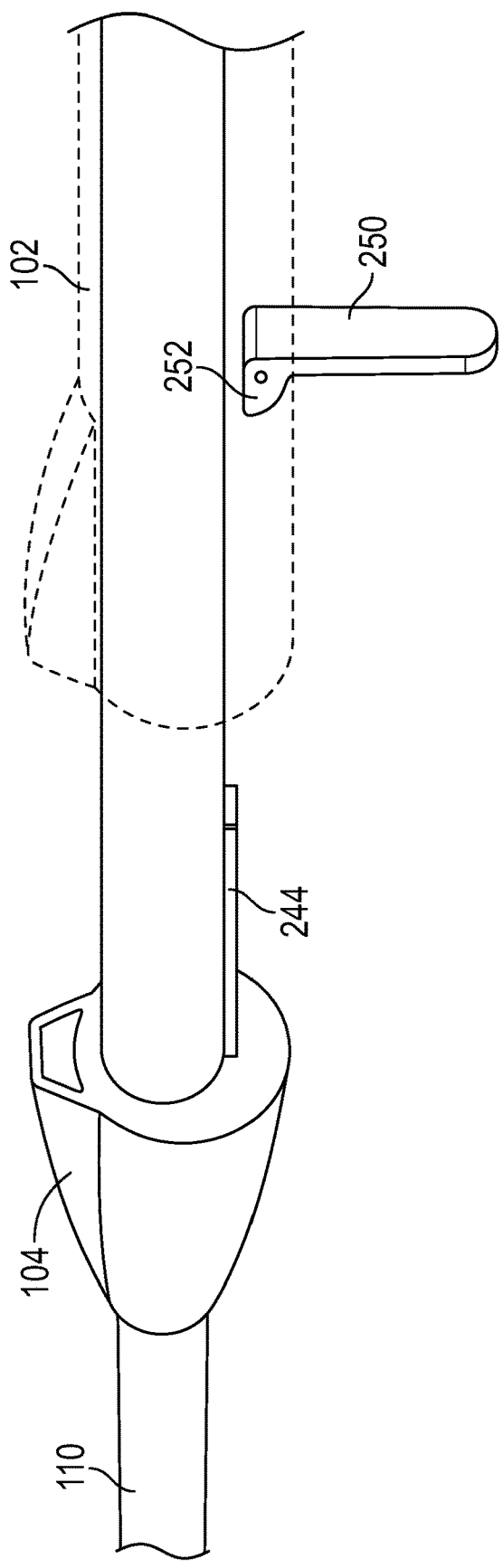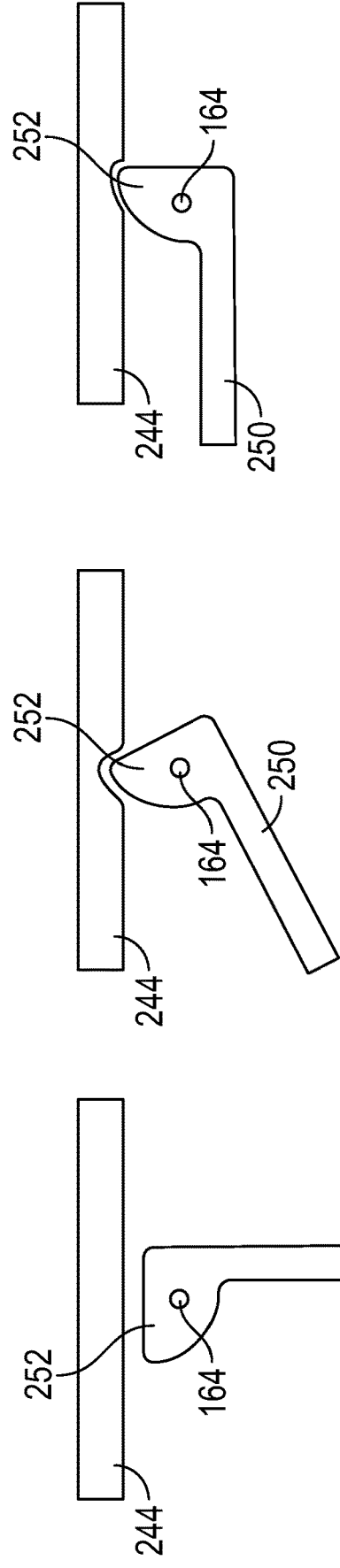

US 11,445,712 B2

CAM REEL ATTACHMENT

The present application claims priority to U.S. Prov. Pat. App. Ser. No. 62/981,623, filed Feb. 26, 2020, which is incorporated herein in its entirety.

BACKGROUND

Many conventional fishing reels include a forward facing seat and a backward facing seat configured for fixing a corresponding reel to a fishing rod through an additional attachment. Known attachments can loosen over time, lacking means for effectively locking the reel to the fishing rod, especially for extended periods of time common in fishing practice. Further, known attachments lack an ergonomic aspect for a user handling the fishing rod.

SUMMARY

According to one aspect, a grip assembly configured for fixing a reel to a fishing rod includes a front seat grip non-movably fixable to a fishing rod, a gear rack on the front seat grip, a sliding grip movably fixable to the fishing rod and configured to slide in an axial direction of the fishing rod so as to selectively engage the front seat grip, a lever pivotally connected to the sliding grip, and at least one tooth provided on the lever. When the lever is actuated from an open position to a locked position, the at least one tooth engages the gear rack and the lever pulls the sliding grip toward the front seat grip on the fishing rod.

According to another aspect, a grip assembly configured for fixing a reel to a fishing rod includes a front seat grip non-movably fixable to a fishing rod, a sliding grip movably fixable to the fishing rod and configured to slide in an axial direction of the fishing rod so as to selectively engage the front seat grip, a lever pivotally connected to the sliding grip, and a pad disposed on the front seat grip and formed from a material that is relatively flexible as compared to the lever. When the lever is actuated from an open position to a locked position, the lever pivots into an interference position with the pad so as to deform the pad around the lever, and pulls the sliding grip toward the front seat grip on the fishing rod.

According to another aspect, a method of fixing a reel to a fishing rod with a grip assembly includes non-movably fixing a front seat grip onto a fishing rod, movably fixing a sliding grip onto the fishing rod such that the sliding grip is configured to slide in an axial direction of the fishing rod so as to selectively engage the front seat grip, and actuating a lever pivotally connected to the sliding grip from an open position to a locked position such that the lever engages the front seat grip and pulls the sliding grip toward the front seat grip on the fishing rod.

BRIEF DESCRIPTION OF THE DRAWINGS

FIG. 15 is an schematic side view of a grip assembly in an unlocked configuration according to another aspect of the present disclosure.

FIG. 16 is a schematic side view of the grip assembly of FIG. 15 in a locked position.

FIG. 17 is a schematic side view of a grip assembly according to another aspect of the present disclosure.

FIGS. 18, 19 and 20 are partial schematic views of the grip assembly of FIG. 17 in successive stages of assembly.

DETAILED DESCRIPTION

Figure 1:
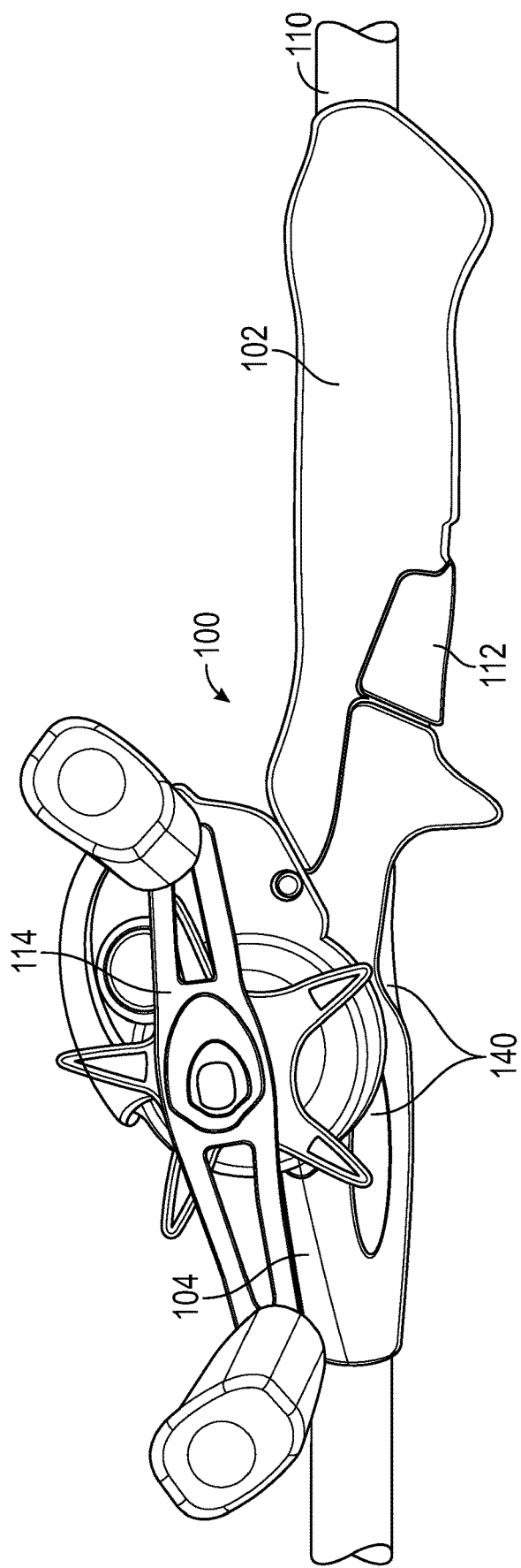
FIG. 1 is a side view of a grip assembly according to one aspect of the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a grip assembly 100 including a sliding grip 102 engaged with a front seat grip 104 on a fishing rod 110. The front seat grip 104 is non-movably fixed to the fishing rod 110 at a position forward of the sliding grip 102, and the sliding grip 102 is configured to slide in an axial direction of the fishing rod 110 so as to selectively engage the front seat grip 104. A lever closure 112 pivotally fixed to the sliding grip 102 is configured to lock the sliding grip 102 with the front seat grip 104 on the fishing rod 110 when the sliding grip 102 is proximate the front seat grip 104 on the fishing rod 110 and the lever closure 112 is in a locked position relative to the sliding grip 102 and the front seat grip 104. The sliding grip 102 and the front seat grip 104 are configured to selectively fix a reel 114 relative to the fishing rod 110 when the sliding grip 102 is locked with the front seat grip 104.

Figure 2:
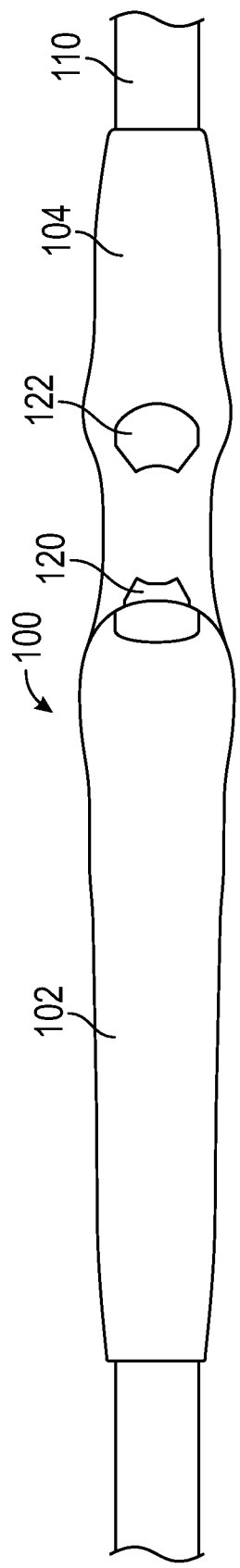
FIG. 2 is a top view of the grip assembly of FIG. 1.

FIG. 2 depicts a top view of the grip assembly 100 without the reel 114. As shown, the sliding grip 102 includes a sliding grip recess 120 defined therein and configured for receiving a rear reel seat (not shown) of the reel 114. The front seat grip 104 includes a front seat grip recess 122 defined therein and configured for receiving a front reel seat (not shown) of the reel 114. The sliding grip recess 120 and the front seat grip recess 122 are respectively located on the sliding grip 102 and the front seat grip 104 such that the sliding grip recess 120 and the front seat grip recess 122 face each other when the sliding grip 102 and the front seat grip 104 are assembled with the fishing rod 110. As such, when the reel 114 is placed between the sliding grip 102 and the front seat grip 104 along a length of the fishing rod 110 with the front reel seat extending toward the front seat grip recess 122 and the rear reel seat extending toward the sliding grip recess 120, and the sliding grip 102 is repositioned on the fishing rod 110 toward the front seat grip 104, the front reel seat is received in the front seat grip recess 122 and the rear reel seat is received in the sliding grip recess 120, fixing the reel 114 to the fishing rod 110.

The sliding grip 102 and the front seat grip 104 forming the grip assembly 100 are ergonomically shaped for various holding configurations. Taken from the side view of the grip assembly 100 depicted in FIG. 3, the sliding grip 102 and the front seat grip 104 each feature a curved side profile configured to effectively accommodate a user's grip on the fishing rod 110. The sliding grip 102 includes a sliding grip top portion 124 and a sliding grip bottom portion 130, where the sliding grip top portion 124 is formed from a relatively rigid material as compared to the sliding grip bottom portion 130. As shown, the lever closure 112 is pivotally fixed to the sliding grip bottom portion 130. In an embodiment, the sliding grip top portion 124 is formed from a hard plastic, and the sliding grip bottom portion 130 is formed from a relatively soft material such as thermoplastic rubber or a foam material. Notably, the sliding grip top portion 124 and the sliding grip bottom portion 130 can be made of additional or alternative materials effective for creating relatively rigid and flexible portions of the grip assembly 100 without departing from the scope of the present disclosure.

In an embodiment, the grip assembly 100 includes a butt end (not shown) disposed on a proximal end of the fishing rod 110 to provide an additional gripping feature supplemental to the sliding grip 102 and the front seat grip 104. The butt end, the sliding grip 102, and the front seat grip 104 may have complementary features designed for various holding configurations by a user, including a holding configuration where the butt end is held against a body of the user.

The front seat grip 104 includes a front seat grip top portion 132 and a front seat grip bottom portion 134, where the front seat grip top portion 132 is formed from a relatively rigid material as compared to the sliding grip bottom portion 130. As shown in FIG. 1, at least one recessed area 140 of the front seat grip bottom portion 134 exposes the fishing rod 110 to direct contact by a user's grip. While FIG. 1 depicts only one recessed area as the at least one recessed area 140, additional recessed areas included in the at least one recessed area 140 may be defined in the front seat grip bottom portion 134 in accordance with facilitating an ergonomic grip on the grip assembly 100 that maintains a sensitivity to vibrations in the fishing rod 110. In an embodiment, the front seat grip top portion 132 is formed from a hard plastic, and the front seat grip bottom portion 134 is formed from a relatively soft material such as thermoplastic rubber or a foam material. With this construction, the sliding grip top portion 124 is rigid relative to the sliding grip bottom portion 130. In further embodiments, the sliding grip top portion 124 is formed from a same material as the front seat grip top portion 132, and the sliding grip bottom portion 130 is formed from a same material as the front seat grip bottom portion 134. Notably, the front seat grip top portion 132 and the front seat grip bottom portion 134 can be made of additional or alternative materials effective for creating relatively rigid and flexible portions of the grip assembly 100 without departing from the scope of the present disclosure.

Figure 3:
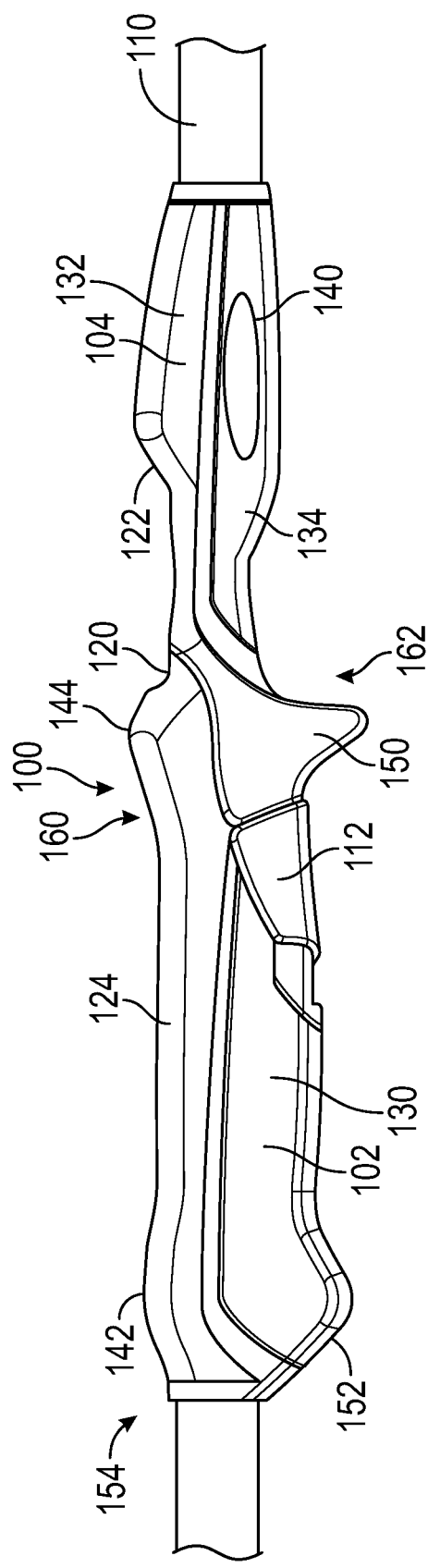
FIG. 3 is a side view of the grip assembly of FIG. 1.

With reference to FIG. 3, the sliding grip recess 120 is defined in the sliding grip top portion 124, and the front seat grip recess 122 is defined in the front seat grip top portion 132. As such, the sliding grip top portion 124 is configured for receiving the front reel seat of the reel 114 and the front seat grip top portion 132 is configured for receiving the rear reel seat of the reel 114, fixing the reel 114 with respect to the fishing rod 110.

The grip assembly 100 includes a first elevated surface 142, a second elevated surface 144, a third elevated surface 150, and a fourth elevated surface 152 configured for retaining a user's grip on the sliding grip 102 and the front seat grip 104 in the axial direction of the fishing rod 110. With continued reference to FIG. 3, the first elevated surface 142 extends radially outward from the sliding grip top portion 124 at a sliding grip rear end portion 154 with respect to the axial direction of the fishing rod 110; the second elevated surface 144 extends radially outward from the sliding grip top portion 124 at a sliding grip front end portion 160 with respect to the axial direction of the fishing rod 110; the third elevated surface 150 extends radially outward from the front seat grip bottom portion 134 at a front seat grip rear end portion 162 with respect to the axial direction of the fishing rod 110; and the fourth elevated surface 152 extends radially outward from the sliding grip bottom portion 130 at the sliding grip rear end portion 154 with respect to the axial direction of the fishing rod 110. The first elevated surface 142 is integrally formed from the sliding grip top portion 124, the second elevated surface 144 is integrally formed from the sliding grip top portion 124, the third elevated surface 150 is integrally formed from the front seat grip bottom portion 134, and the fourth elevated surface 152 is integrally formed from the sliding grip bottom portion 130.

Figure 4:
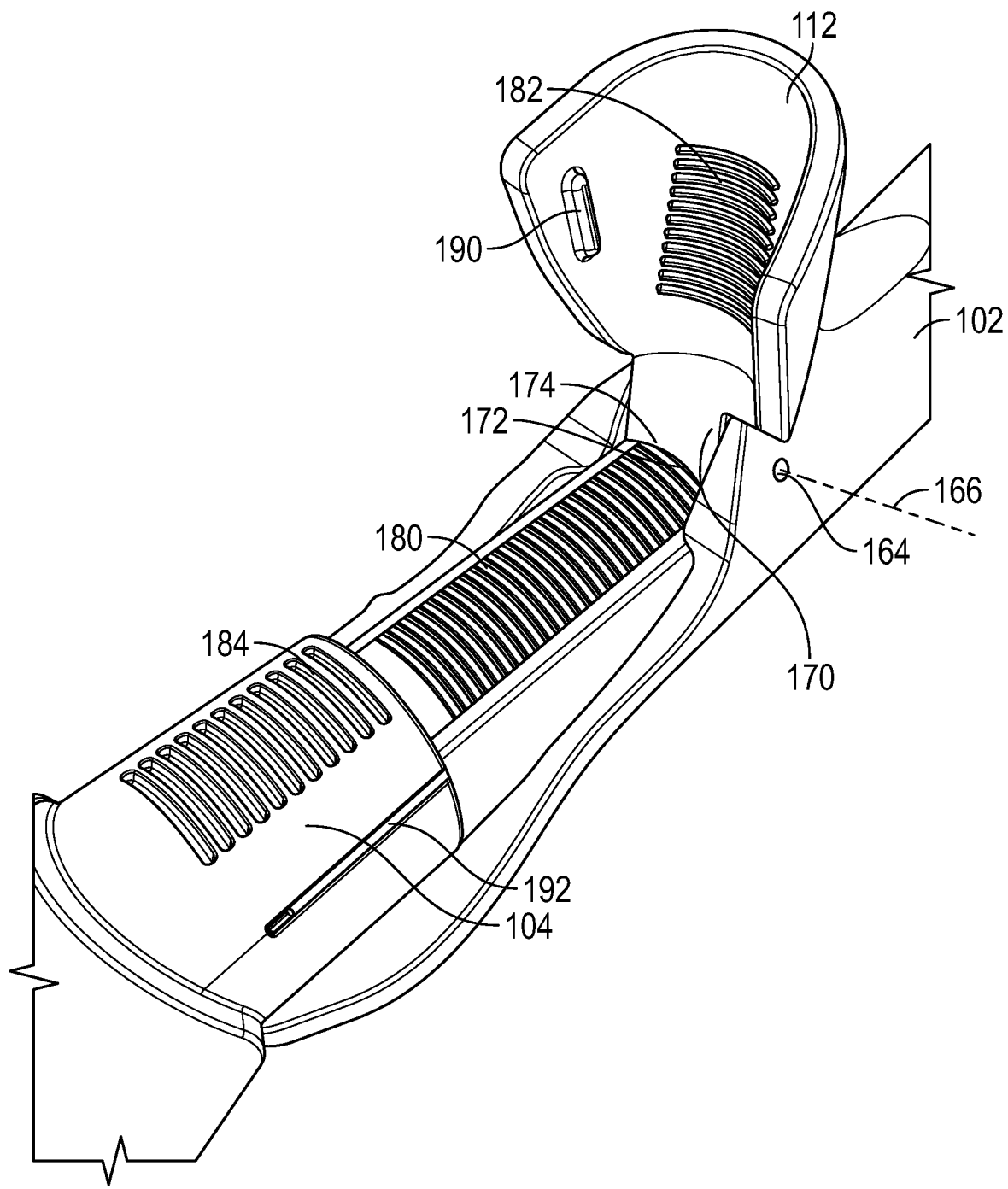
FIG. 4 is a partial perspective view of the grip assembly of FIG. 1 with a lever closure in an open position.

FIG. 4 depicts a perspective view of the lever closure 112 in an open position, where the lever closure 112 is unlocked from the front seat grip 104 such that the sliding grip 102 is able to slide along the fishing rod 110 relative to the front seat grip 104. As shown, the lever closure 112 is pivotally fixed to the sliding grip 102 with a rod 164 directed through the lever closure 112 and the sliding grip 102 in a direction orthogonal to the axial direction of the fishing rod 110 when the sliding grip 102 is assembled with the fishing rod 110. The lever closure 112 is configured to pivot about the rod 164 relative to the sliding grip 102 between the open position and the locked position, and in this manner the rod 164 defines a lever closure pivot axis 166 of the lever closure 112 directed orthogonal to the axial direction of the fishing rod 110 when the sliding grip 102 is assembled with the fishing rod 110.

A portion of the lever closure 112 located between the rod 164 and the front seat grip 104 forms a lever 170 having at least one tooth 172 provided on a distal end 174 of the lever 170, where the locked position of the lever closure 112 corresponds with a locked position of the lever 170, and the open position of the lever closure 112 corresponds with an open position of the lever 170. In the depicted embodiment, the at least one tooth 172 is a single tooth configured to engage a gear rack 180 which is formed from a plurality of grooves defined in the front seat grip 104 and oriented orthogonal to the axial direction of the fishing rod 110 when the sliding grip 102 and the front seat grip 104 are assembled on the fishing rod 110. The plurality of grooves forming the gear rack 180 are curved around the fishing rod 110 in a circumferential direction of the fishing rod 110, and the at least one tooth 172 is curved in a manner complementary to the plurality of grooves forming the gear rack 180.

The lever closure 112 includes a first set of detents 182 that is at least one detent extending from the lever closure 112 and oriented in a direction orthogonal to the axial direction of the fishing rod 110. The first set of detents 182 are located on a portion of the lever closure 112 across the rod 164 and the lever closure pivot axis 166 from the at least one tooth 172. The first set of detents 182 is located radially about the lever closure pivot axis 166 with respect to the at least one tooth 172 such that the first set of detents 182 is configured to extend toward and engage a corresponding second set of detents 184 defined in the front seat grip 104 when the sliding grip 102 is assembled with the front seat grip 104 on the fishing rod 110 and the lever closure 112 is in the locked position where the at least one tooth 172 engages the gear rack 180. When engaged, the first set of detents 182 and the second set of detents 184 lock a position of the sliding grip 102 along the fishing rod 110 relative to the front seat grip 104. A third set of detents 190 is at least one detent extending from the lever closure 112 and oriented in a direction in parallel with the axial direction of the fishing rod 110 when the sliding grip 102 is assembled with the front seat grip 104 and the lever closure 112 is in the locked position. The third set of detents 190 is configured to engage a corresponding fourth set of detents 192 defined in the front seat grip 104 when the lever closure 112 is engaged with the 104 in the locked position. When engaged, the third set of detents 190 and the fourth set of detents 192 are configured to selectively retain the lever closure 112 in the locked position.

The first set of detents 182 and the second set of detents 184 are aligned in the axial direction of the fishing rod 110, and the detents of the fourth set of detents 192 are elongated in the axial direction of the fishing rod 110. With this construction, the first set of detents 182 is configured to engage the second set of detents 184 when the sliding grip 102 is in a range of positions on the fishing rod 110 relative to the front seat grip 104. Similarly, the third set of detents 190 is configured to engage the fourth set of detents 192 when the sliding grip 102 is in a range of positions on the fishing rod 110 relative to the front seat grip 104.

Figure 5:
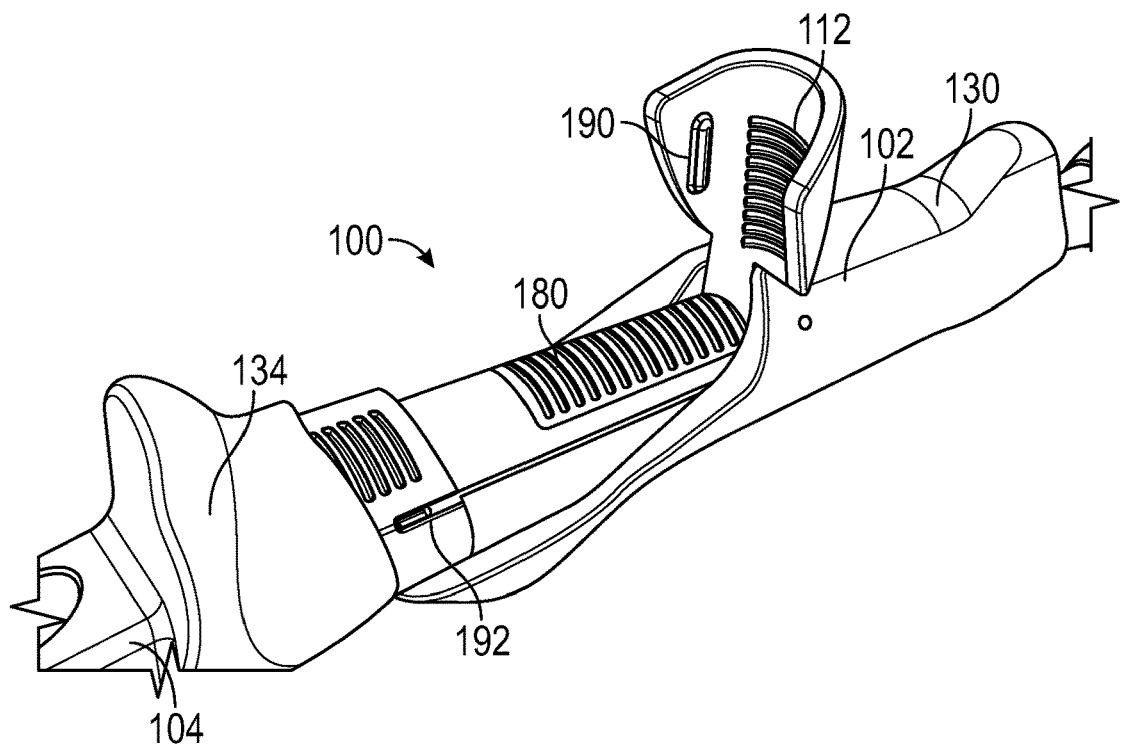
FIGS. 5, 6 and 7 are partial perspective views of the grip assembly of FIG. 1 in successive stages of assembly.
Figure 6:
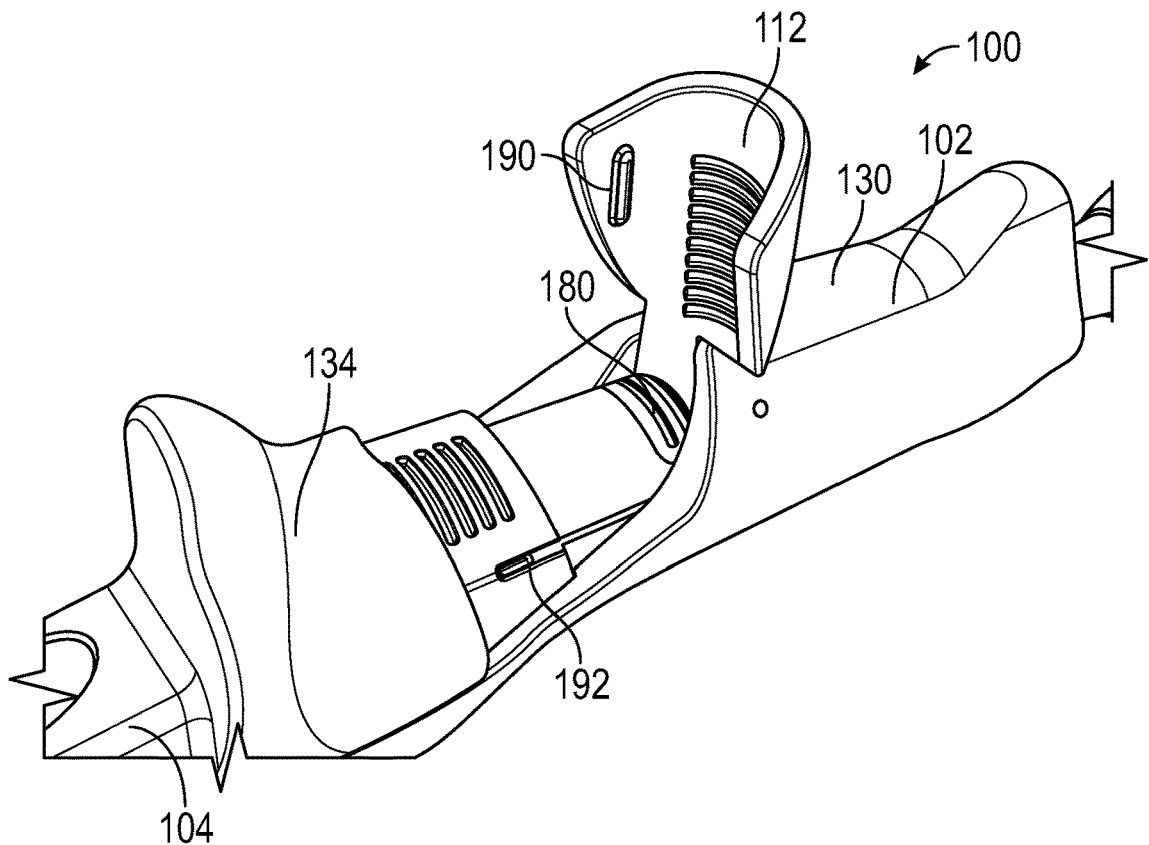
Figure 7:
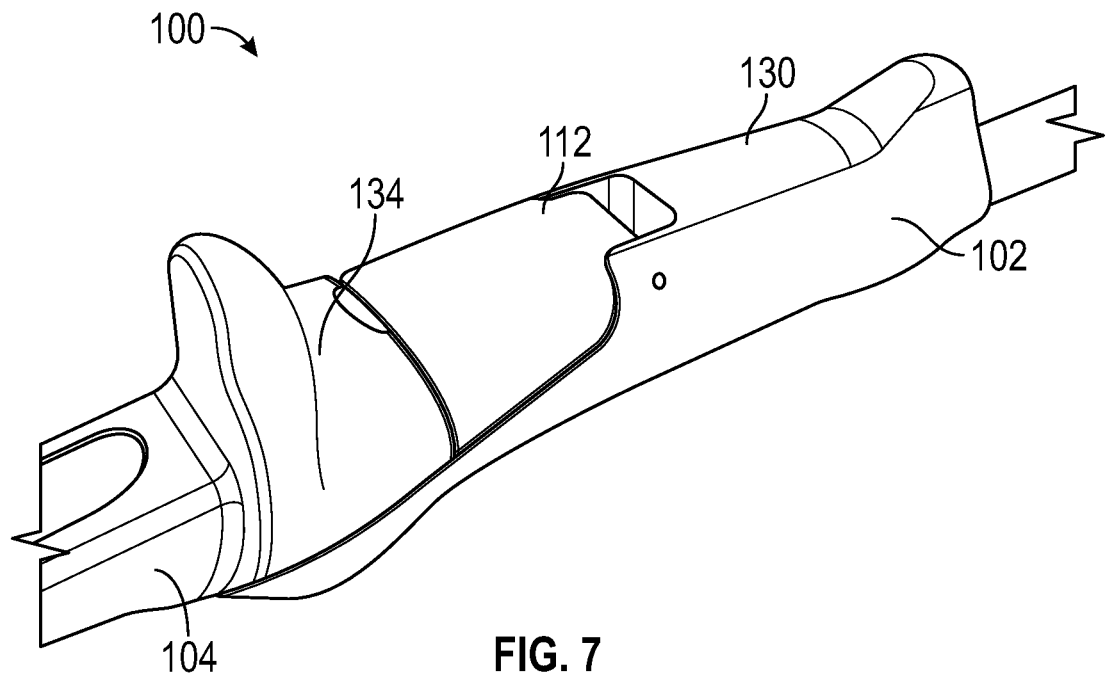

FIGS. 5-7 depict the sliding grip 102 and the front seat grip 104 of the grip assembly 100 in successive stages of assembly. FIG. 5 depicts the sliding grip 102 positioned away from the front seat grip 104 with the lever closure 112 in the open position over the gear rack 180 such that the sliding grip 102 is able to slide along the fishing rod 110 relative to the front seat grip 104. FIG. 6 depicts the sliding grip 102 repositioned on the fishing rod 110 toward the front seat grip 104 with the lever closure 112 in the open position and oriented away from the sliding grip bottom portion 130. FIG. 7 depicts the lever closure 112 in the locked position and engaged with the front seat grip 104, extending between the sliding grip bottom portion 130 and the front seat grip bottom portion 134. As shown, the lever closure 112 is approximately flush with the sliding grip bottom portion 130 and the front seat grip bottom portion 134

As shown between FIGS. 6 and 7, when the lever closure 112 is actuated from the open position to the locked position, the at least one tooth 172 engages the gear rack 180 before the lever closure 112 is fully actuated to the locked position. Once the at least one tooth 172 is engaged with the gear rack 180, continued rotation of the lever closure 112 toward the locked position pulls the sliding grip 102 closer to the front seat grip 104 until the lever closure 112 is in the locked position.

Figure 8:
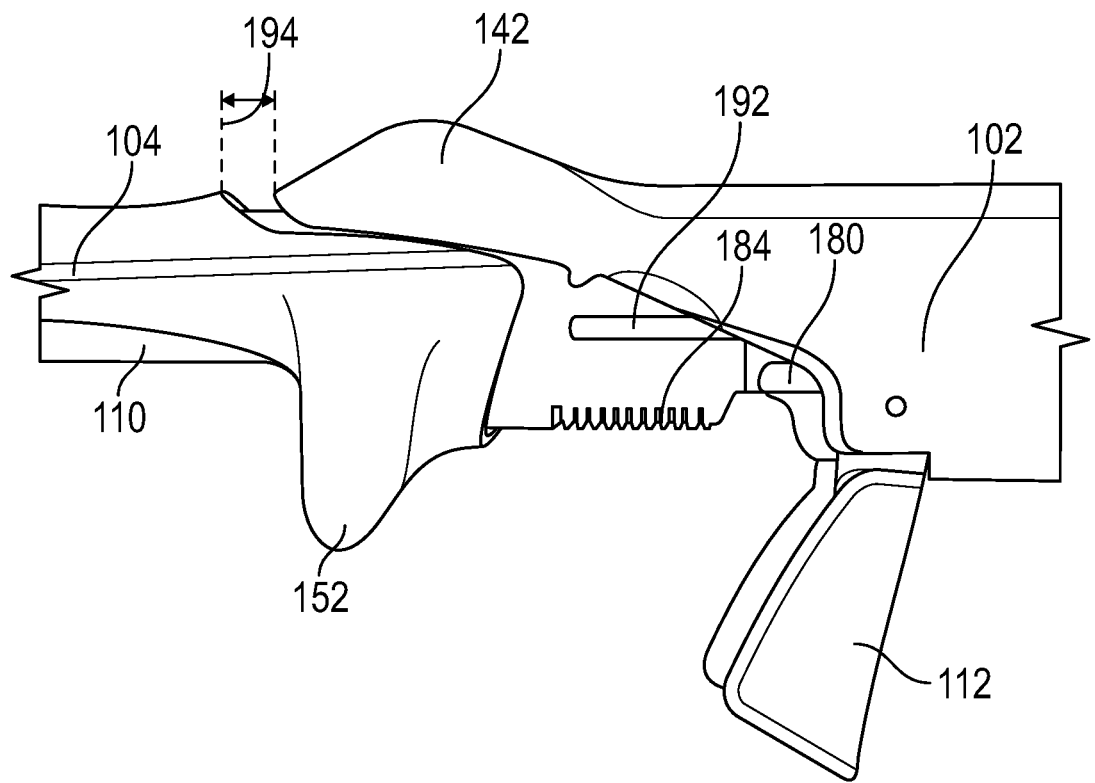
FIGS. 8 and 9 are partial side views of the grip assembly of FIG. 1 with the lever closure in respective open and closed/locked positions.
Figure 9:
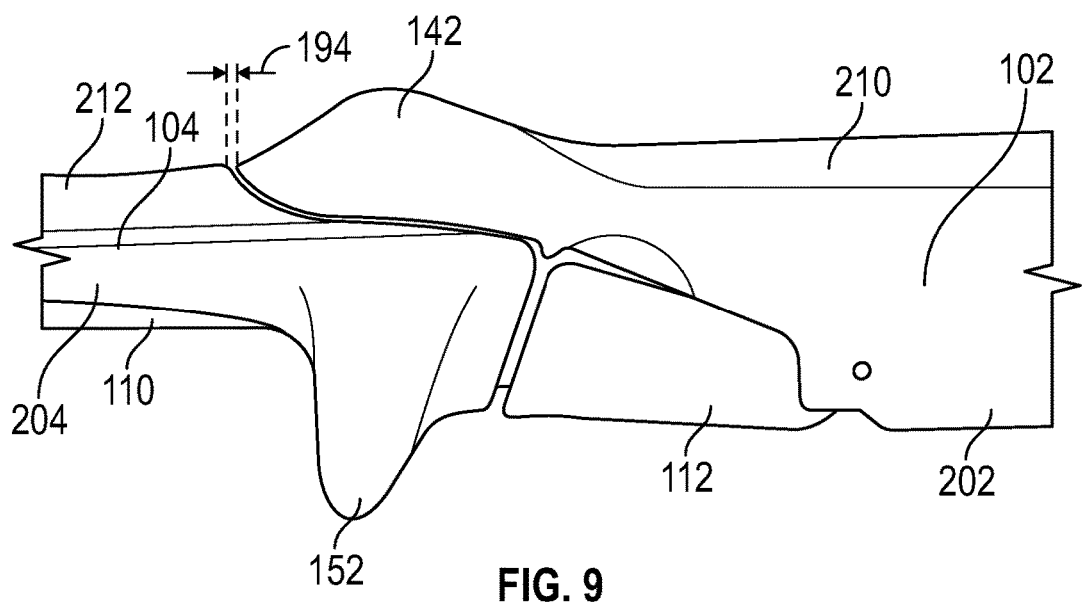

FIG. 8 depicts a side view of the grip assembly 100 with the lever closure 112 in the open position. As shown, when the sliding grip 102 is positioned forward toward the front seat grip 104, a gap 194 remains therebetween. When the lever closure 112 is actuated toward the locked position as in FIG. 9, the lever closure 112 pulls the sliding grip 102 further toward the front seat grip 104, reducing the gap 194.

Figure 10:
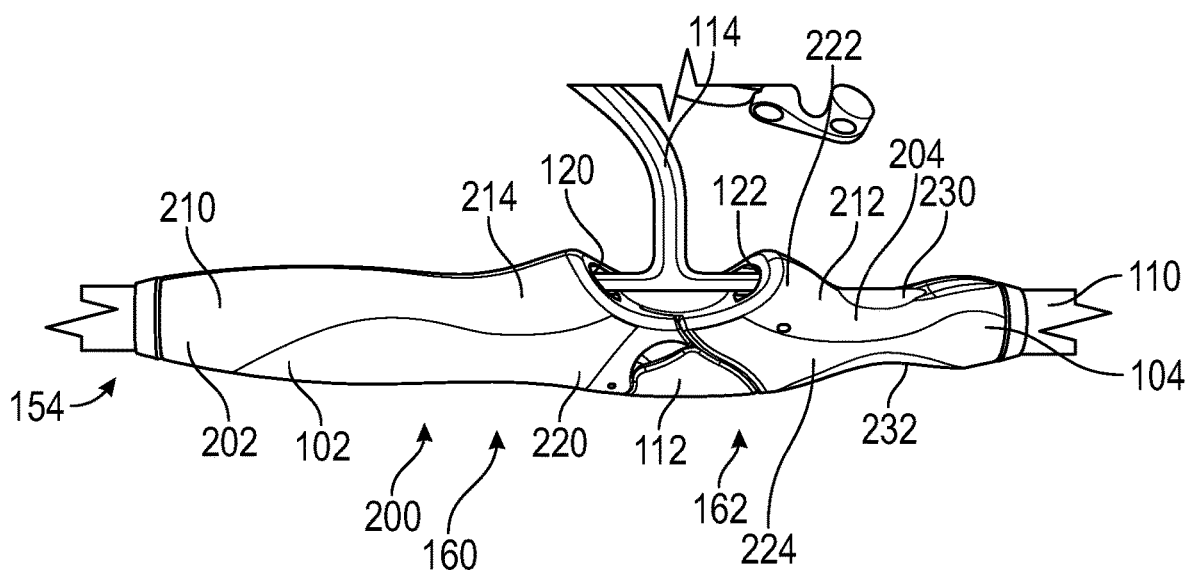
FIG. 10 is a side view of a grip assembly according to another aspect of the present disclosure.
Figure 11:
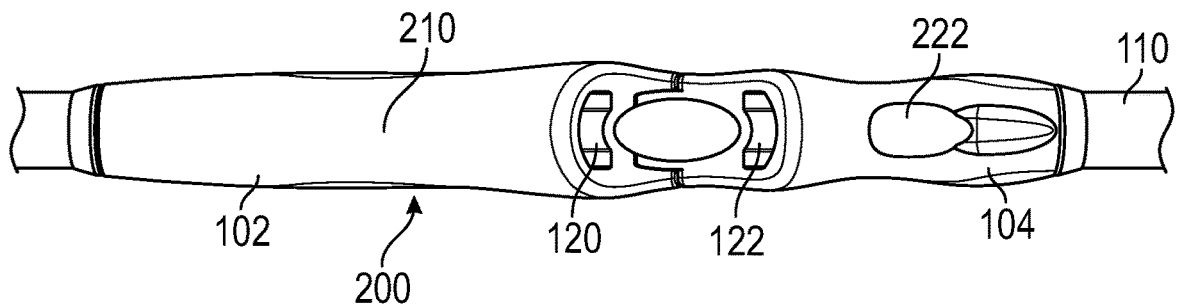
FIG. 11 is a top view of the grip assembly of FIG. 10.

FIGS. 10 and 11 depict a grip assembly 200 according to another aspect of the present disclosure. As shown, the reel 114 is fixed to the fishing rod 110 between the sliding grip 102 and the front seat grip 104, and engaged with a sliding grip bottom portion 202 and a front seat grip bottom portion 204. More specifically, the sliding grip recess 120 is defined in the sliding grip top portion 210, and the front seat grip recess 122 is defined in the front seat grip top portion 212. As such, the sliding grip top portion 210 is configured for receiving the rear reel seat of the reel 114 and the front seat grip top portion 212 is configured for receiving the front reel seat of the reel 114, fixing the reel 114 with respect to the fishing rod 110. As shown in FIG. 10, the lever closure 112 is pivotally fixed to a sliding grip top portion 210, and configured to engage a front seat grip top portion 212.

Taken from the side view of the grip assembly 200 depicted in FIG. 10, the sliding grip 102 includes a first elevated surface 214 extending from the sliding grip top portion 210 at the sliding grip front end portion 160, and a second elevated surface 220 extending from the sliding grip bottom portion 202 at the sliding grip front end portion 160. Also as shown, the sliding grip top portion 210 and the sliding grip bottom portion 202 taper toward the fishing rod 110 at the sliding grip rear end portion 154. The front seat grip 104 includes a third elevated surface 222 extending from the front seat grip top portion 212 at the front seat grip rear end portion 162, and a fourth elevated surface 224 extending from the front seat grip bottom portion 204 at the front seat grip rear end portion 162. Also as shown, at least one recessed area 230 of the front seat grip bottom portion 204 exposes the fishing rod 110 to a user's grip, and at least one recessed area 232 of the front seat grip top portion 212 exposes the fishing rod 110 to a user's grip.

In the depicted embodiment, aspects of the sliding grip top portion 210 and aspects of the sliding grip bottom portion 202 are formed from one of a hard plastic and a relatively soft material such as thermoplastic rubber or a foam material. Specifically, aspects of the sliding grip 102 including the first elevated surface 214 are formed from the hard plastic and aspects of the sliding grip 102 including the second elevated surface 220 are formed from the relatively soft material, while aspects of the front seat grip 104 including the third elevated surface 222 are formed from the hard plastic and aspects of the front seat grip 104 including the fourth elevated surface 224 are formed from the relatively soft material. Notably, the sliding grip top portion 210 and the sliding grip bottom portion 202 can be made of additional or alternative materials effective for creating relatively rigid and flexible portions of the grip assembly 100 without departing from the scope of the present disclosure.

In additional or alternative embodiments of the grip assembly 200, the front seat grip top portion 212 is formed from a hard plastic, and the front seat grip bottom portion 204 is formed from a relatively soft material such as thermoplastic rubber or a foam material. With this construction, the sliding grip top portion 210 and the front seat grip top portion 212 are relatively rigid as compared to the sliding grip bottom portion 202 and the front seat grip bottom portion 204, and the sliding grip bottom portion 202 and the front seat grip bottom portion 204 are relatively flexible as compared to the sliding grip top portion 210 and the front seat grip top portion 212. In further embodiments, the sliding grip top portion 210 is formed from a same material as the front seat grip top portion 212, and the sliding grip bottom portion 202 may be formed from a same material as the front seat grip bottom portion 204. Notably, the front seat grip top portion 212 and the front seat grip bottom portion 204 can be made of additional or alternative materials effective for creating relatively rigid and flexible portions of the grip assembly 200 without departing from the scope of the present disclosure.

Figure 12:
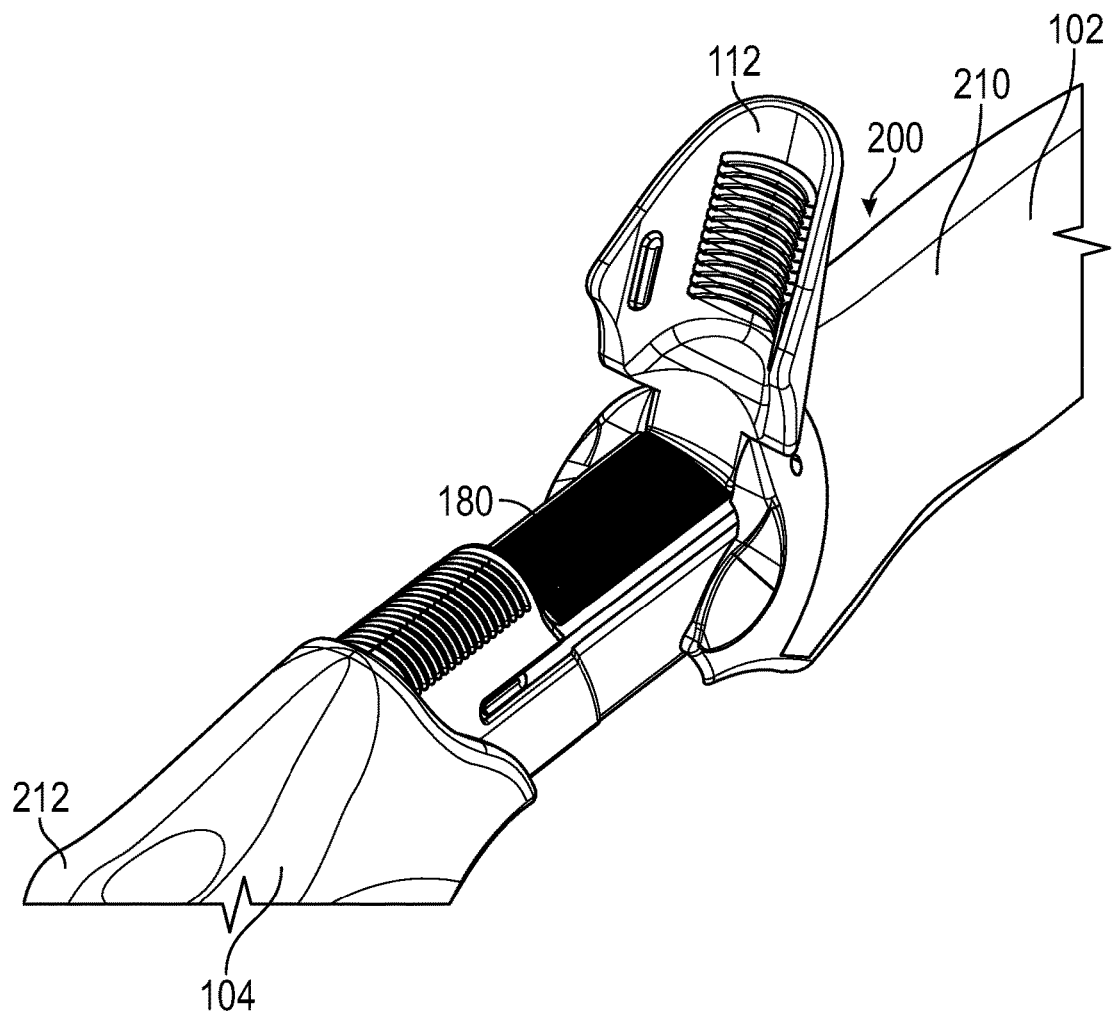
FIGS. 12, 13 and 14 are partial perspective views of the grip assembly of FIG. 10 in successive stages of assembly.
Figure 13:
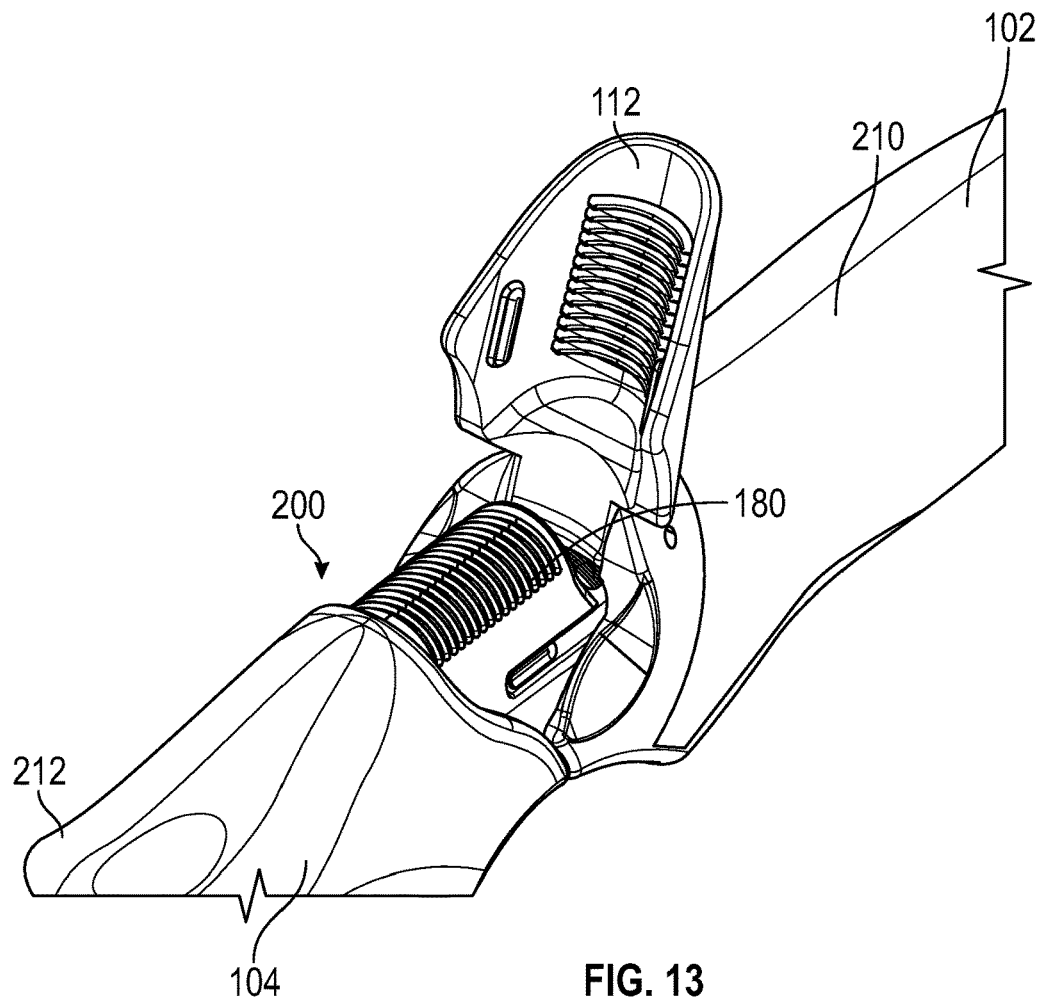
Figure 14:
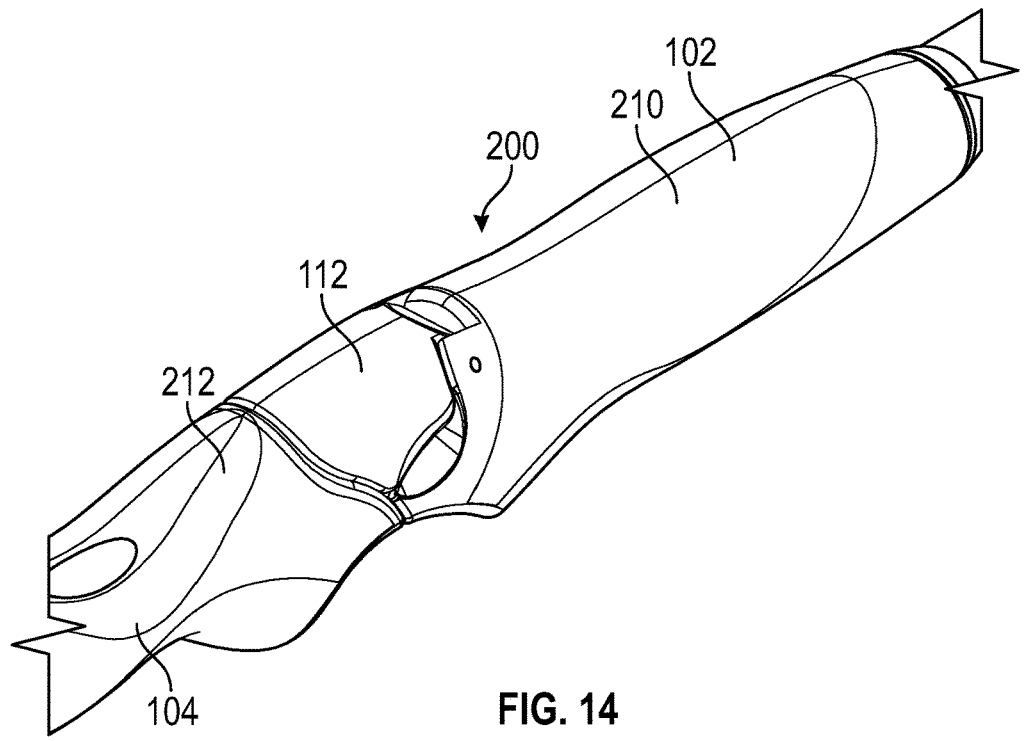

FIGS. 12-14 depict the sliding grip 102 and the front seat grip 104 of the grip assembly 200 in successive stages of assembly. FIG. 12 depicts the sliding grip 102 positioned away from the front seat grip 104 with the lever closure 112 in an open position over the gear rack 180 such that the sliding grip 102 is able to slide along the fishing rod 110 relative to the front seat grip 104. FIG. 13 depicts the sliding grip 102 repositioned on the fishing rod 110 toward the front seat grip 104 with the lever closure 112 in the open position, oriented away from the sliding grip top portion 210. FIG. 14 depicts the lever closure 112 in the locked position, extending between the sliding grip top portion 210 and the front seat grip top portion 212. As shown, the lever closure 112 is approximately flush with the sliding grip bottom portion 202 and the front seat grip bottom portion 204.

In an embodiment depicted in FIGS. 15 and 16, the sliding grip 102 includes a lever 234 connected to a partial barrel gear 240 having a plurality of teeth 242 provided thereon and configured for engaging the gear rack 180. The plurality of teeth 242 are configured for engaging the gear rack 180 when the lever 234 is actuated from an open position to a locked position, pulling the sliding grip 102 toward the front seat grip 104 until the lever 234 is in the locked position. As shown in FIG. 15, when the lever 234 is in the open position, none of the plurality of teeth 242 are engaged with the gear rack 180 such that the sliding grip 102 is able to slide along the fishing rod 110 relative to the front seat grip 104. As shown in FIG. 16, at least one of the plurality of teeth 242 are engaged with the gear rack 180 when the lever 234 is in the locked position.

In an embodiment depicted in FIG. 17, the front seat grip 104 includes a pad 244 disposed thereon and formed from a flexible material, such as rubber. As depicted, an over-center lever 250 including a cam 252 extending therefrom is pivotally fixed to the sliding grip 102 and configured for selectively engaging the pad 244 with the cam 252 when the over-center lever 250 is actuated from an open position to a locked position. The pad 244 is formed from a material that is relatively flexible as compared to the over-center lever 250. FIG. 18 depicts the over-center lever 250 in the open position relative to the pad 244, where the cam 252 is spaced from the pad 244 such that the over-center lever 250 and the sliding grip 102 are enabled to slide along the fishing rod 110 relative to the front seat grip 104. FIG. 19 depicts the over-center lever 250 in a locking position that is intermediate the open position and the locked position, where the cam 252 is engaged with the pad 244 such that further actuation of the over-center lever 250 toward the locked position pulls the sliding grip 102 toward the front seat grip 104 with the cam 252. FIG. 20 depicts the over-center lever 250 lever in the locked position, where the cam 252 is engaged with the pad 244 and inhibits sliding movement of the sliding grip 102 relative to the front seat grip 104. Because the pad 244 is formed from a material that is relatively flexible as compared to the over-center lever 250, deformation of the flexible material catches the cam 252 and prevents the sliding grip 102 from sliding relative to the front seat grip 104 and loosening the reel 114 with respect to the fishing rod 110. As shown in FIGS. 19 and 20, when the over-center lever 250 is engaged with the pad 244, the cam 252 is pivoted into an interference position with the pad 244 such that the cam 252 deforms the pad 244 around the cam 252 in a pivoting range of motion relative to the front seat grip 104 defined between and including the locking position and the locked position.

According to an aspect of the present disclosure, a method of fixing the reel 114 to the fishing rod 110 with a grip assembly 100 includes non-movably fixing a front seat grip 104 onto a fishing rod 110, movably fixing a sliding grip 102 onto the fishing rod 110 such that the sliding grip 102 is configured to slide in an axial direction of the fishing rod 110 so as to selectively engage the front seat grip 104, and actuating a lever 170 pivotally connected to the sliding grip 102 from an open position to a locked position such that the lever 170 engages the front seat grip 104 and pulls the sliding grip 102 toward the front seat grip 104 on the fishing rod 110. In an embodiment, the step of actuating the lever 170 from the open position to the locked position includes the engaging at least one tooth 172 provided on the distal end 174 of the lever 170 with a gear rack 180 formed from a plurality of grooves defined in the front seat grip 104. In an alternative embodiment, the step of actuating the over-center lever 250 from the open position to the locked position includes engaging the cam 252 extending from the over-center lever 250 with the pad 244 disposed on the front seat grip 104 such that the cam 252 deforms the pad and the pad 244 catches the cam 252.

It will be appreciated that variations of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A grip assembly configured for fixing a fishing reel to a fishing rod, the grip assembly comprising:
a front seat grip non-movably fixable to a fishing rod;
a gear rack on the front seat grip;
a sliding grip movably fixable to the fishing rod and configured to slide in an axial direction of the fishing rod so as to selectively engage the front seat grip;
a lever pivotally connected to the sliding grip;
at least one tooth provided on the lever,
wherein when the lever is actuated from an open position to a locked position, the at least one tooth engages the gear rack and the lever pulls the sliding grip toward the front seat grip on the fishing rod;
a lever closure that includes the lever, the lever closure being pivotally fixed to the sliding grip about a lever closure pivot axis;
a first set of detents that is at least one detent extending from the lever closure, the first set of detents being located on a portion of the lever closure across the lever closure pivot axis from the at least one tooth; and
a second set of detents defined in the front seat grip, and
wherein the first set detents is located radially about the lever closure pivot axis with respect to the at least one tooth such that the first set of detents is configured to extend toward and engage the second set of detents when the lever closure is in the locked position so as to lock a position of the sliding grip along the fishing rod relative to the front seat grip.

2. The grip assembly of claim 1, further comprising:
a front seat grip recess defined in the front seat grip and configured for receiving an associated front reel seat of a fishing reel; and
a sliding grip recess defined in the sliding grip and configured for receiving an associated rear reel seat of the fishing reel,
wherein the sliding grip recess and the front seat grip recess are respectively located on the sliding grip and the front seat grip such that the sliding grip recess and the front seat grip recess face each other when the sliding grip and the front seat grip are assembled with the fishing rod.

3. The grip assembly of claim 2, further comprising:
a sliding grip top portion and a sliding grip bottom portion included in the sliding grip;
a front seat grip top portion and a front seat grip bottom portion included in the front seat grip;

wherein the sliding grip recess is defined in the sliding grip top portion and the front seat grip recess is defined in the front seat top portion such that the sliding grip top portion is configured for receiving the rear reel seat and the front seat grip top portion is configured for receiving the front reel seat.

4. The grip assembly of claim 3, wherein the lever is pivotally fixed to the sliding grip bottom portion.

5. The grip assembly of claim 1, further comprising:
a sliding grip top portion and a sliding grip bottom portion included in the sliding grip,
wherein the sliding grip top portion is formed from a relatively rigid material as compared to the sliding grip bottom portion.

6. The grip assembly of claim 1, further comprising:
a front seat grip top portion and a front seat grip bottom portion included in the front seat grip,
wherein the front seat grip top portion is formed from a relatively rigid material as compared to the front seat grip bottom portion.

7. The grip assembly of claim 1, further comprising:
a gear connected to the lever,
wherein the at least one tooth is a plurality of teeth provided on the gear and configured for engaging the gear rack when the lever is actuated from the open position to the locked position.

8. The grip assembly of claim 1, further comprising:
a plurality of grooves forming the gear rack, the plurality of grooves being defined in the front seat grip and oriented orthogonal to the axial direction of the fishing rod when the sliding grip and the front seat grip are assembled on the fishing rod.

9. The grip assembly of claim 8, wherein the plurality of grooves forming the gear rack are curved at least partially around the fishing rod in a circumferential direction of the fishing rod, and the at least one tooth is curved in a manner complementary to the plurality of grooves forming the gear rack.

10. The grip assembly of claim 1, further comprising:
a third set of detents that is at least one detent extending from the lever closure and oriented in a direction in parallel with the axial direction of the fishing rod when the lever closure is in the locked position; and
a fourth set of detents defined in the front seat grip, corresponding and configured for engagement with the third set of detents so as to selectively retain the lever closure in the locked position,
wherein the first set of detents is oriented in a direction orthogonal to the axial direction of the fishing rod such that the first set of detents engages the second set of detents when the lever closure is in the locked position so as to lock a position of the sliding grip along the fishing rod relative to the front seat grip.

11. A grip assembly configured for fixing a fishing reel to a fishing rod, the grip assembly comprising:
a front seat grip non-movably fixable to a fishing rod;
a gear rack on the front seat grip;
a sliding grip movably fixable to the fishing rod and configured to slide in an axial direction of the fishing rod so as to selectively engage the front seat grip;
a lever pivotally connected to the sliding grip;
at least one tooth provided on the lever,
wherein when the lever is actuated from an open position to a locked position, the at least one tooth engages the gear rack and the lever pulls the sliding grip toward the front seat grip on the fishing rod;
a sliding grip top portion and a sliding grip bottom portion included in the sliding grip;
a front seat grip top portion and a front seat grip bottom portion included in the front seat grip; and
a lever closure that includes the lever, wherein when the lever closure is actuated in a locked position corresponding with the locked position of the lever, the lever closure is approximately flush with the sliding grip bottom portion and the front seat grip bottom portion.

12. The grip assembly of claim 1, further comprising:
a front seat grip top portion and a front seat grip bottom portion included in the front seat grip,
wherein at least one recessed area of the front seat grip bottom portion exposes a portion of the fishing rod to direct contact by a user's grip.

* * * * *